(12) United States Patent
Klug

(10) Patent No.: US 6,369,920 B1
(45) Date of Patent: Apr. 9, 2002

(54) REFERENCE BEAM DEFLECTING ELEMENT FOR RECORDING A HOLOGRAM

(75) Inventor: Michael A. Klug, Austin, TX (US)

(73) Assignee: Zebra Imaging, Inc., Pflugerville, TX (US)

(*) Notice: Subject to any disclaimer, the term of this patent is extended or adjusted under 35 U.S.C. 154(b) by 0 days.

(21) Appl. No.: 09/636,118

(22) Filed: Aug. 10, 2000

Related U.S. Application Data

(60) Provisional application No. 60/148,137, filed on Aug. 10, 1999.

(51) Int. Cl.$^7$ .............................. G02B 5/32; G03H 1/04
(52) U.S. Cl. ........................... 359/15; 359/30; 359/599; 359/600; 359/613
(58) Field of Search ........................... 359/15, 30, 599, 359/600, 613, 34

(56) References Cited

U.S. PATENT DOCUMENTS

| 5,254,388 A | 10/1993 | Melby et al. ............... 428/120 |
| 5,870,224 A | 2/1999 | Saitoh et al. ............... 359/456 |

FOREIGN PATENT DOCUMENTS

| JP | 1-210-922 A | * 8/1989 | ................. 359/17 |
| JP | 4-294316 A | * 10/1992 | ................. 359/22 |

OTHER PUBLICATIONS

Masahiro Yamaguchi, Hideaki Endoh, Toshio Honda and Nagaaki Ohyama, "High–Quality Recording Of A Full Parallax Holographic Stereogram With A Digital Diffuser," *Optics Letters*, vol. 19 No. 2, Jan. 15, 1994, pp. 135–137.

Masahiro Yamaguchi, Takahiro Koyama, Hideaki Endoh, Nagaaki Ohyama, Susumu Takahashi and Fujio Iwata, "Development Of A Prototype Full–Parallax Holoprinter," *Proc SPIE.*, vol. 2406 "Practical Holography IX," Apr., 1995, pp. 50–56.

Michael A. Klug, Michael W. Halle, Mark Lucente, Wendy J. Plesniak, "A Compact Prototype One–Step Ultragram Printer," To Appear in *SPIE Proc.*, vol. 1914 "*Practical Holography VII: Imaging and Materials*" (*SPIE,. Bellingham, WA, Feb. 1993*) paper #3 (in press), pp. 1–10.

Michael A. Klug, Michael W. Halle, Paul M. Hubel, "Full Color Ultragrams," To Appear in *SPIE Proc.*, vol. 1667 "*Practical Holography VI*" (*SPIE, Bellingham, WA, Feb. 1992*) paper #12 (in press), pp. 1–10.

Michael W. Halle, Stephen A. Benton, Michael A. Klug, John S. Underkoffler, "The Ultragram: A Generalized Holographic Stereogram," To Appear in *SPIE Proc.*, vol. 1461 "*Practical Holography V*" (*SPIE,. Bellingham, WA. Feb. 1991*) paper #21 (in press), pp. 1–14.

* cited by examiner

Primary Examiner—Jon Henry
(74) Attorney, Agent, or Firm—Skjerven Morrill MacPherson LLP; Marc R. Ascolese

(57) ABSTRACT

A system and method to divert a reference beam from intersecting with a diffuser disposed adjacent to a holographic recording material for recording a hologram. The invention includes a thin holographic deflector designed to deflect the reference beam away from the diffuser and to prevent the reference beam's passage and impingement onto the diffuser surface. The holographic deflector is designed to deflect only light impinging on it from the particular angle that the reference beam strikes the holographic recording material, and to transmit nearly all other light striking it. The deflector eliminates artifacts from the resulting hologram introduced by the reflected reference beam, while allowing the diffuser to be placed very close to the holographic material.

22 Claims, 7 Drawing Sheets

US 6,369,920 B1

REFERENCE BEAM DEFLECTING ELEMENT FOR RECORDING A HOLOGRAM

This application claims the benefit of U.S. Provisional Application No. 60/148,137, filed Aug. 10, 1999, under 35 U.S.C. § 119 (e). The above-referenced provisional application is hereby incorporated by reference herein in its entirety.

FIELD OF THE INVENTION

The present invention relates in general to the field of hologram production and display and, more particularly, to a system and method for diverting at least a portion of a reference beam from impinging upon a diffuser disposed adjacent to holographic recording material.

BACKGROUND OF THE INVENTION

One-step hologram (including holographic stereogram) production technology has been used to satisfactorily record holograms without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam. Examples of techniques for one-step hologram production can be found in the U.S. Patent Application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety.

In many holographic recording systems, and particularly in one-step reflection holographic recording systems, a diffuser is used to evenly distribute light in the object beam on to the holographic recording material. Typically, the diffuser is an anisotropic diffuser. To achieve a high quality hologram, the diffuser is placed as close as is possible to the holographic recording material. In recording a reflection hologram, the reference beam is directed at the holographic recording material from the opposite side as the object beam. Because of the closeness of the diffuser to the holographic recording material, the reference beam passes through the holographic recording material and impinges upon the surface of the diffuser. The surface of the diffuser usually reflects light from the reference beam back through the holographic recording material a second time. Moreover, because of the nature of the diffuser, the reflected light from the reference beam is typically reflected at a variety of angles.

The reflected light from the reference beam can be reflected such that it interferes with the reference beam as it traverses the holographic recording material. This problem is illustrated in FIG. 1. Light from reference beam 25 passes through holographic recording material 70 and is reflected by diffuser 58 as reflected reference beam portions 125. That interference pattern is recorded in the holographic recording material, resulting in an undesirable artifact that resembles a vertical line seemingly positioned infinitely deep with respect to the hologram plane. This results from the recording of a single beam hologram of the diffuser surface. This artifact is both distracting to the viewer and damaging to the diffraction efficiency, and thus the brightness, of the image. Additionally, reflected light from the reference beam can be reflected such that it interferes with the object beam, potentially creating interference patterns that are recorded in the holographic recording material. While in principle, those recorded interference patterns are similar to the interference patterns that are intended to be recorded (i.e., the interference pattern created by the original, un-reflected, reference beam and the object beam), the fact that the interference patterns were formed using light reflected from the reference beam means that additional distortion or unwanted artifacts might be present.

A number of strategies have been used to reduce and/or eliminate the problem of interaction between the reference beam and the diffuser. One solution is to place an anti reflection coating on the diffuser surface. However, anti-reflective coatings usually are effective only for particular bandwidths of wavelengths and certain angles of incidence of incoming light. Due to the extreme and varied angles at which a reference beam may strike a diffuser, and due to the fact that some diffusers are volumetric devices that have no surface relief, this technique has not proven successful. In practice, anti-reflective coatings have proven to eliminate only about 30% of reflected reference beam light, whereas to eliminate the artifacts described above, a greater percentage of the reflected reference beam light should be eliminated. Furthermore, anti-reflective coatings are difficult to uniformly apply over large areas such as the surface area of a diffuser.

Another technique is the use of a light control or "louver screen" film between the diffuser and the associated holographic recording material. As illustrated in FIG. 2, light from reference beam 25 passes through holographic recording material 70 and impinges upon louver screen film 59, where the light is absorbed, and/or generally prevented from reflecting back toward reference beam 25 by louvers 159. Object beam 20 passes through diffuser 58 and, because of the structure of louvers 159, generally passes through louver screen film 59. The result is diffused object beam 120. Louver screen film is a commercially available volumetric substrate that typically contains microscopic opaque strips or louvers, arranged in a parallel formation at a selected variable angle analogous to a venetian blind arrangement. Louver screen film is chosen with a particular blind spacing and angle that allows passage of the object beam light, for example, at angles of zero to plus or minus thirty degrees (±30°), while absorbing reference beam light impinging at higher angles of, for example, approximately forty five degrees (45°). Such louver screen film successfully prevents reference beam light from impinging and reflecting off the surface of the diffuser, and thus eliminates the unwanted artifacts.

One problem associated with using louver screen film is the film's requisite thickness (on the order of 1 mm) which necessarily further separates the diffuser from the surface of the holographic recording material. Because the louver screen film separates the diffuser and holographic recording material, the diffuser plane and the hologram plane are not as close together as is possible, which leads to poorer quality recorded holograms. Louver screen film may also introduce other artifacts into the hologram, due to the film's periodicity and diffractive effects associated with the passage of light through the narrow louvers of the film. Finally, louver film often absorbs a significant percentage of the object beam light, again due to the existence of louvers within the film material, along with intrinsic substrate and surface absorption and reflection.

Accordingly, it is desirable to have a deflector that overcomes the deficiencies of the prior art, including for example, the thickness, efficiency, and ease of construction and use.

SUMMARY OF THE INVENTION

In accordance with teachings of the present invention, a system and method are provided to prevent at least a portion of a reference beam from intersecting with an associated diffuser. A holographic deflector incorporating teaching of the present invention may be placed between a diffuser and a holographic film or emulsion, similar to the placement of louver screen film. However, the holographic deflector preferably has a much thinner profile, requiring approximately 100–200 microns, as compared to the 1 mm needed to accommodate the louver film.

The holographic deflector is designed to deflect only light impinging on it from the particular angle that the reference beam strikes the holographic emulsion, and transmits nearly all other light strking it. These deflection characteristics are due to the Bragg selectivity of the holographic structure and its recording geometry.

A holographic deflector incorporating teaching of the present invention may have nearly 100% diffraction efficiency, ensuring the passage of little or no reference beam light to the diffuser. The holographic deflector allows the diffuser to be placed close to the holographic emulsion, enabling a closer approach to the ideal case of coincident vertical diffusion and hologram planes. Close placement of the diffuser to the emulsion also reduces another image artifact that is produced when rays from different but neighboring points in the object beam intersect prior to propagation through the holographic emulsion. Such a situation gives rise to a coarse fringe pattern, which manifests itself as dark horizontal lines in the image. Finally, the holographic deflector does not impart any visible artifacts of its own into the fine structure of the image as does louver film. This advantage is due to the microscopic nature of the fringes in a holographic optical element, as compared to the macroscopic structure of the louver film.

Accordingly, one aspect of the present invention provides a system for recording a hologram in a holographic recording material. The holographic recording material has at least a portion including a first surface and a second surface. The system includes a diffuser and a holographic deflector. The diffuser is disposed adjacent to the second surface whereby an object beam directed at the second surface can pass through the diffuser prior to contacting the holographic recording material. The holographic deflector is disposed between the second surface and the diffuser to prevent at least a portion of a reference beam directed at the first surface from impinging on the diffuser.

In another aspect of the present invention, a method for recording a hologram in holographic recording material is disclosed. The holographic recording material has at least a portion disposed in a plane having a first surface and a second surface. A reference beam is directed at the first surface. An object beam is directed at the second surface. A diffuser is disposed adjacent to the second surface whereby the object beam will pass through the diffuser prior to contacting the holographic recording material. At least a portion of a reference beam is deflected with a holographic deflector disposed between the second surface and the diffuser to prevent the reference beam from impinging on the diffuser. An interference pattern formed by the reference beam and the object beam is recorded in the holographic recording material.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 3:
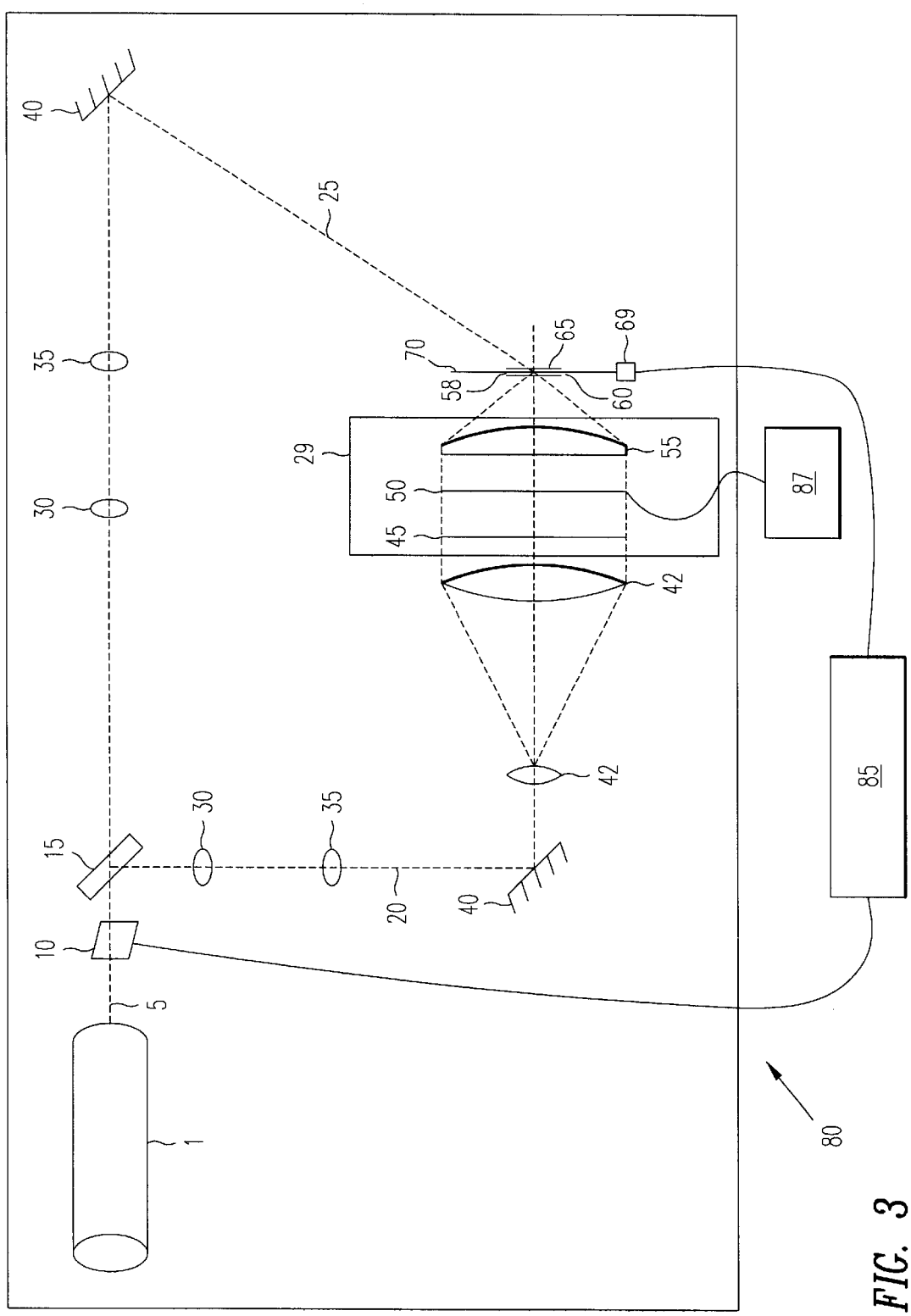
FIG. 3 illustrates an example of a system for producing one-step, monochromatic, holographic-stereograms.

FIG. 3 illustrates a simplified example of a system (e.g., a holographic printer) for producing one-step, monochromatic, holographic-stereograms. Typically, holographic printers like that depicted in FIG. 3 include a monochromatic coherent light source such as laser 1, lenses 42, mirrors 40, and optical system 29, a shutter 10, a mechanism for translating holographic recording material 69, holographic recording material 70, usually in the form of film, a computer 85 for controlling the timing of an exposure sequence, and a separate high-speed computer 87 for image calculations.

The holographic printer of FIG. 3 is typically supported by a vibration isolation table 80. Shutter 10 is located at the output of laser 1, and beam-splitter 15 splits beam 5 into an object beam 20 and a reference beam 25. The polarizations of the object and reference beams are typically adjusted by a pair of half-wave plates 30 and a pair of polarizers 35. The half-wave plates 30 and the polarizers 35 can also be adjusted to control the ratio of the intensity of the two beams 20 and 25. A number of mirrors 40 are used to steer beams 20 and 25 as necessary, while lens 42 serves to expand the object beam prior to introduction into optical system 29.

Optical system 29 includes a diffuser 45, typically a band-limited diffuser, or an isotropic diffuser, a liquid crystal display (LCD) panel 50, and a converging lens 55. LCD panel 50 receives image data calculated by a high-speed computer 87 via an analog or digital signal. LCD panel 50 serves as a spatial light modulator for light passing through the panel. Converging lens 55 focuses images from LCD panel 50 to the holographic recording material 70, through diffuser 58 and holographic deflector 60. Holographic deflector 60 is a holographic optical element designed to "deflect" light from the reference beam. Specifically, at least one of a variety of particular interference patterns is recorded in holographic deflector 60 so that light from the reference beam 25 is diffracted in a preferred direction. Thus, holographic deflector 60 includes one or more holograms that are constructed so that when they are illuminated by a light source such as reference beam 25, light is preferentially deflected. To prevent the exposure of parts of the holographic recording material 70 that are not part of the elemental hologram meant to be exposed, an object beam masking plate (not shown) can be used. Similarly, reference beam masking plate 65 serves to prevent unwanted exposure of parts of the holographic recording material.

Although the present invention will be discussed in the context of simple monochromatic hologram production systems, those having ordinary skill in the art will readily recognize that the principles disclosed herein can be extended to multi-color hologram production systems, such as those disclosed in the aforementioned U.S. patent application Ser. No. 09/098,581.

Figure 4A:
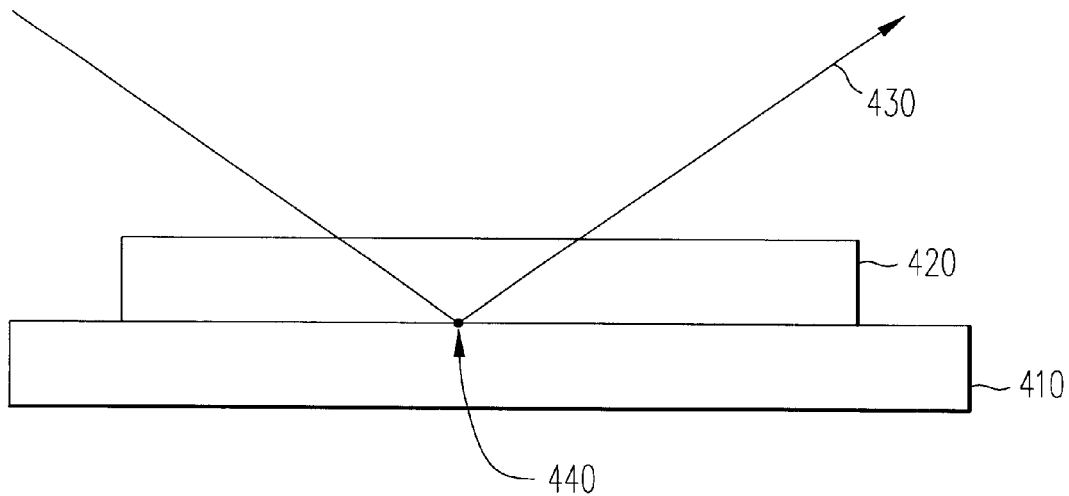
FIGS. 4A–B show the construction and operation of one example of a holographic deflector.
Figure 4B:
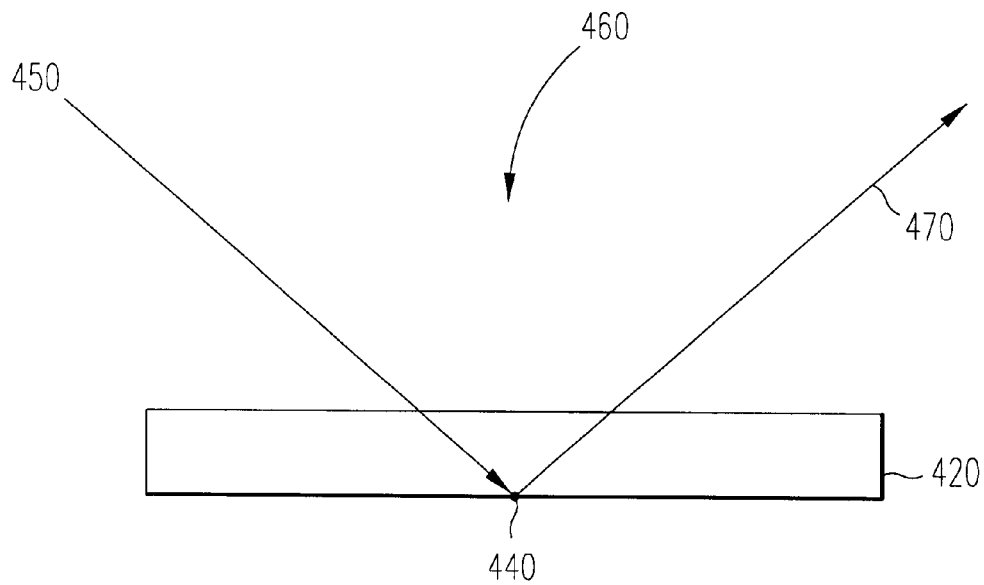

FIGS. 4A–B (collectively FIG. 4) show the construction and operation of one example of a holographic deflector which deflects at least a portion of a reference beam, thereby preventing that portion of the reference beam from impinging upon a diffuser. The holographic deflector of FIG. 4 is made by attaching (e.g., laminating) a holographic recording material (e.g., a photopolymer holographic film) 420 to the front surface of a mirror 410. A beam of light from a coherent light source 430 is oriented with respect to holographic recording material 420 and mirror 410 at the same angle as the reference beam that will be used by to produce a hologram in a holographic printer, for example at the angle between reference beam 25 and holographic recording material 70 in FIG. 3. When light beam 430 is reflected by mirror 410, there is a portion of the holographic recording material 420 within which an interference pattern 440 is recorded. Interference pattern 440 is formed by the incoming beam, and its reflection. Holographic recording material 420 is appropriately processed (e.g., cured) to produce holographic deflector 460.

The resulting hologram "remembers" the angle of incidence and the deflection angle from which it was created. Subsequent light impinging from that angle of incidence will be deflected from the hologram at the deflection angle. This occurs, for example, when holographic deflector 460 is used in the printer of FIG. 3. FIG. 4B illustrates this process. As reference beam 450 impinges upon holographic deflector 460, interference pattern 440 deflects (more specifically, it diffracts) reference beam 450 as deflected beam 470. The deflected beam 470 is deflected at the angle of reflection of reference beam 430 of FIG. 4A (which equals the angle of incidence of the reference beam 430).

The construction process of FIG. 4A produces a holographic deflector that, for a given band of wavelengths, deflects light in a similar fashion as a mirror (where the angle of incidence of the beam equals the angle of deflection) for only a narrow set of angles surrounding the reference beam.

Figure 5A:
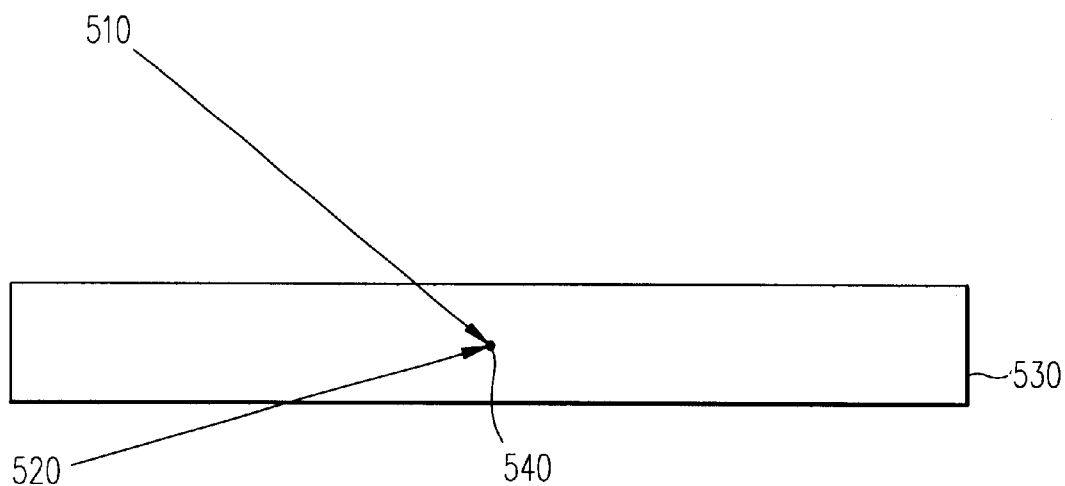
FIGS. 5A–B show the construction and operation of another example of a holographic defector.
Figure 5B:
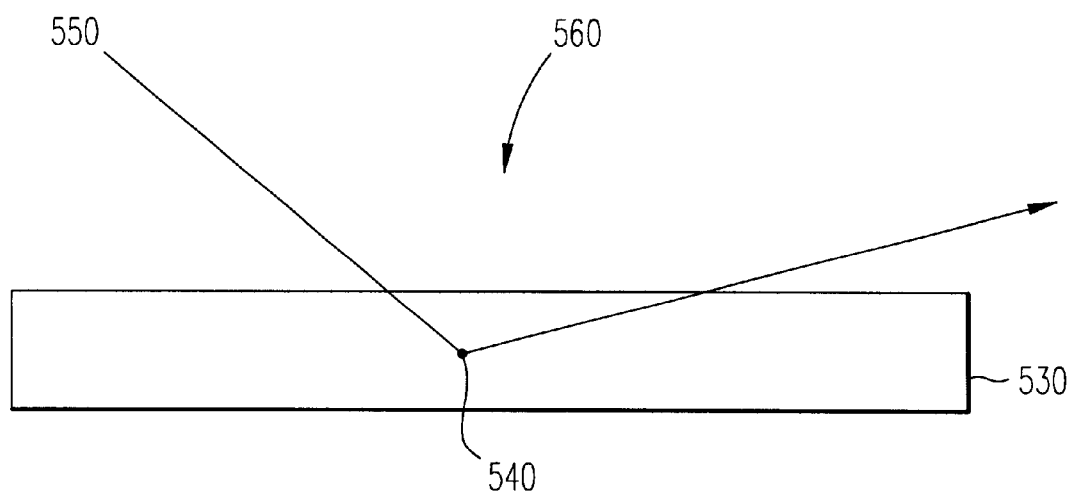

A holographic deflector similar to holographic deflector 460 can be made by intersecting two separate coherent beams within a holographic recording material (eliminating the front-surface mirror). FIGS. 5A–B (collectively FIG. 5) show the construction and operation of such a holographic deflector. The holographic deflector of FIG. 5 is made by intersecting two separate beams from a coherent light source, beam 510 and beam 520, each having a specified angle of incidence with respect holographic recording material 530. As beam 510 and beam 520 interfere, an interference pattern 540 is formed and recorded in respect holographic recording material 530. Holographic recording material 530 is appropriately processed to produce holographic deflector 560. By varying the angle between the two beams, and the orientation of the holographic recording material with respect to the beams, a holographic deflector can be made for which the angle of deflection differs from the angle of incidence of the reference beam that it is designed to deflect. As shown in FIG. 5B, when an incoming beam 550 impinges on holographic deflector 560 from the angle of incidence of beam 510, incoming beam 550 will be deflected at an angle determined by the angle of incidence of beam 520.

Figure 1:
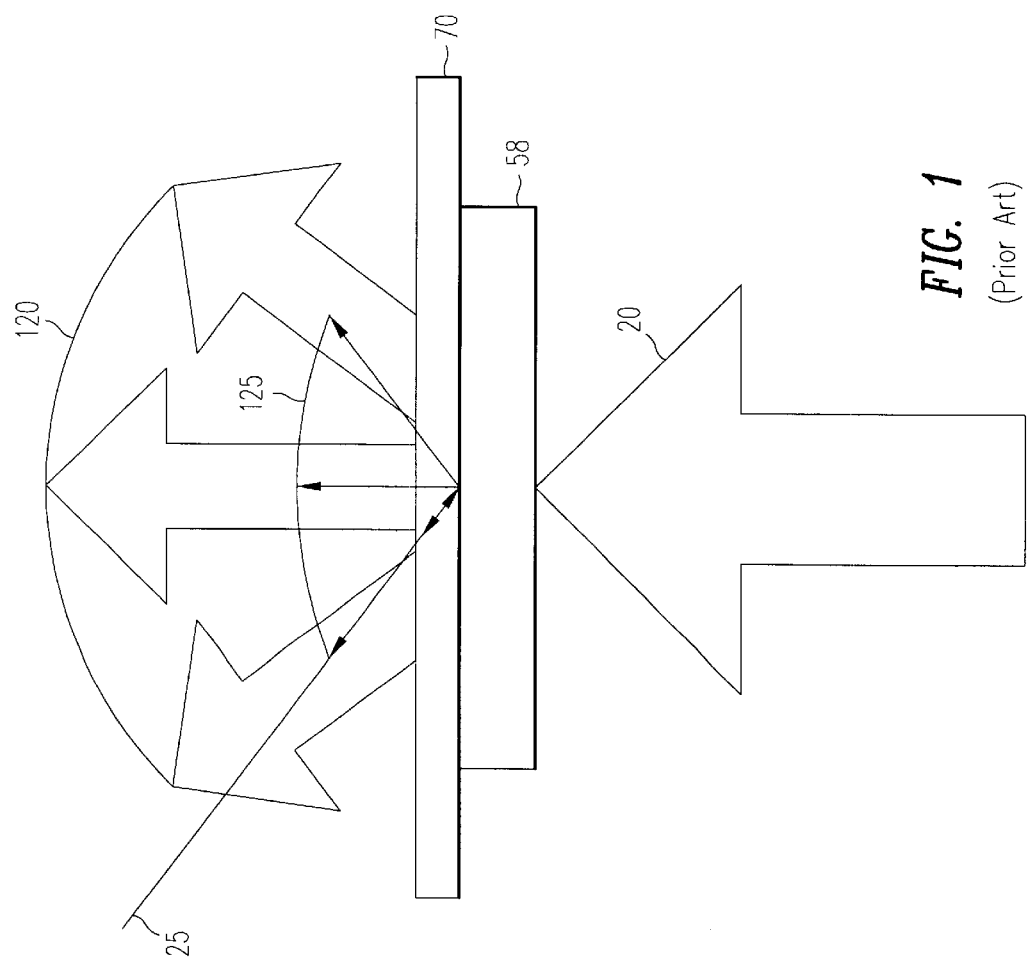
FIG. 1 illustrates the problem of reference beam reflection by a diffuser.
Figure 2:
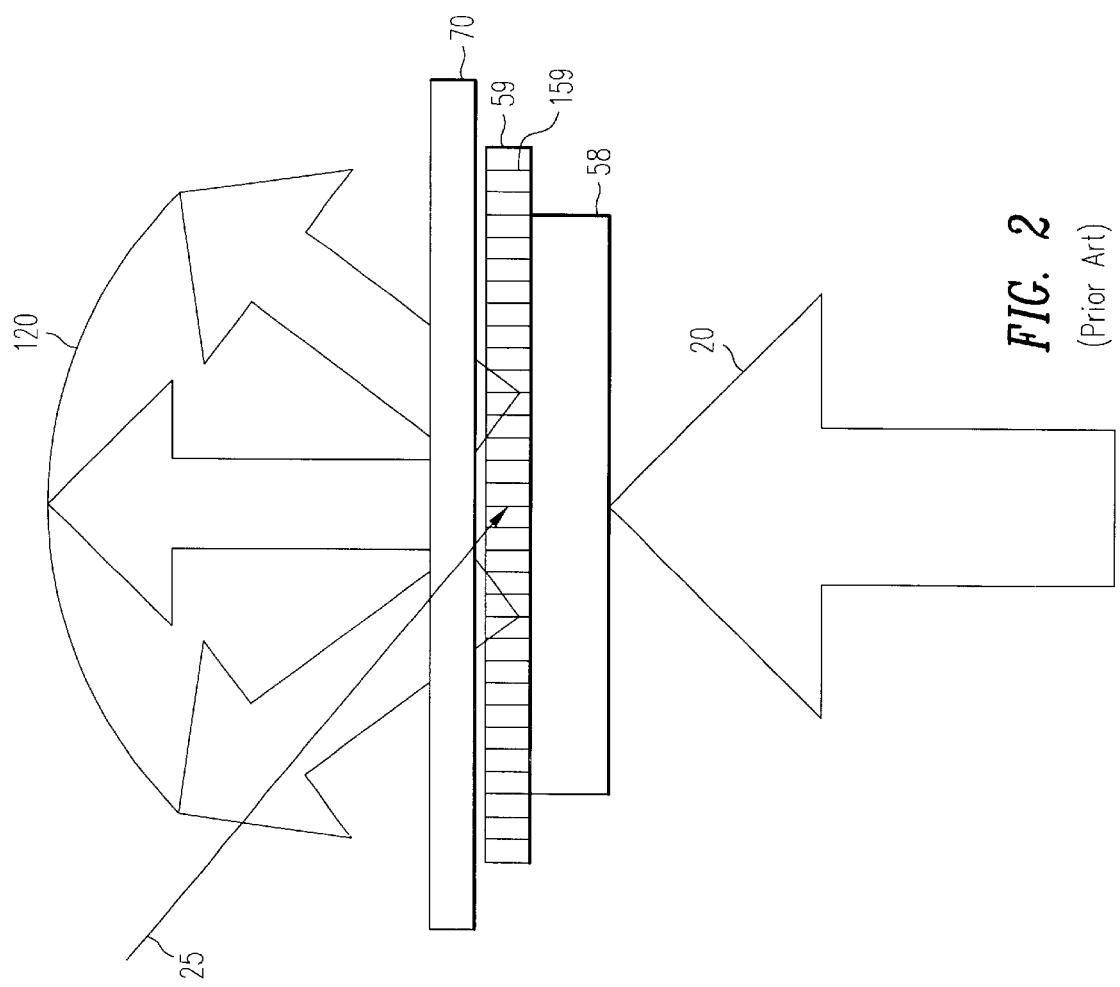
FIG. 2 shows a prior art reference beam deflection solution using louver screen film.
Figure 6:
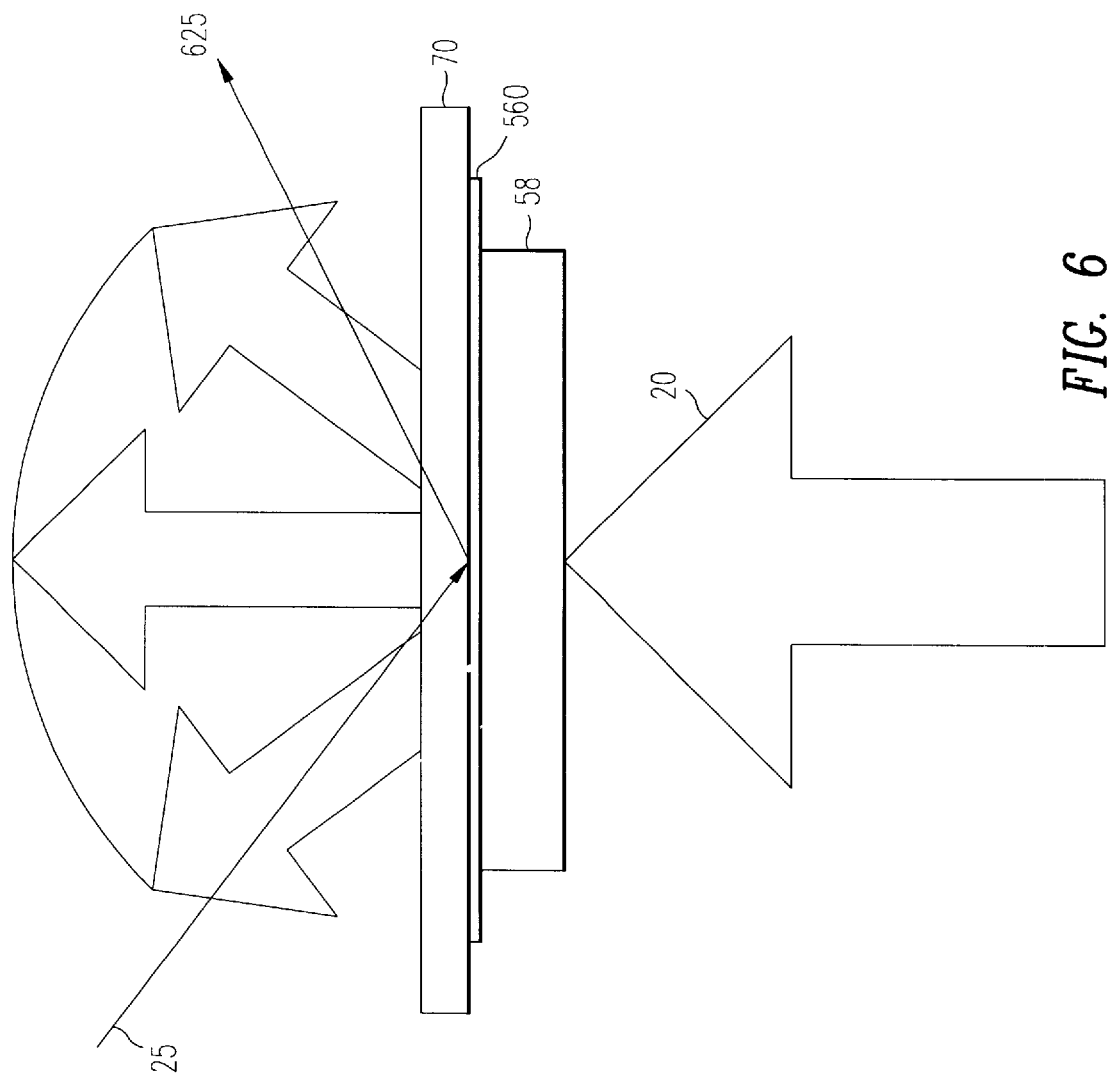
FIG. 6 illustrates the use of the holographic deflector of FIGS. 5A–B in a holographic printer.

The use of holographic deflector 560 in a printer such as the printer of FIG. 1 is further illustrated in FIG. 6. Holographic deflector 560 is interposed between diffuser 58 and holographic recording material 70 to prevent reference beam 25 from impinging on diffuser 58 by deflecting reference beam 25 away from diffuser 58, and in a direction that does not cause an interference pattern to form between reference beam 25 and the deflected beam 625. Since a holographic optical element is a hologram that is specially designed to diffract light a particular way, a holographic deflector that is a holographic optical element can be designed to operate as a lens, as a diffuser, a mirror (concave, convex, or planar), or a variety of other optical elements.

Figure 7:
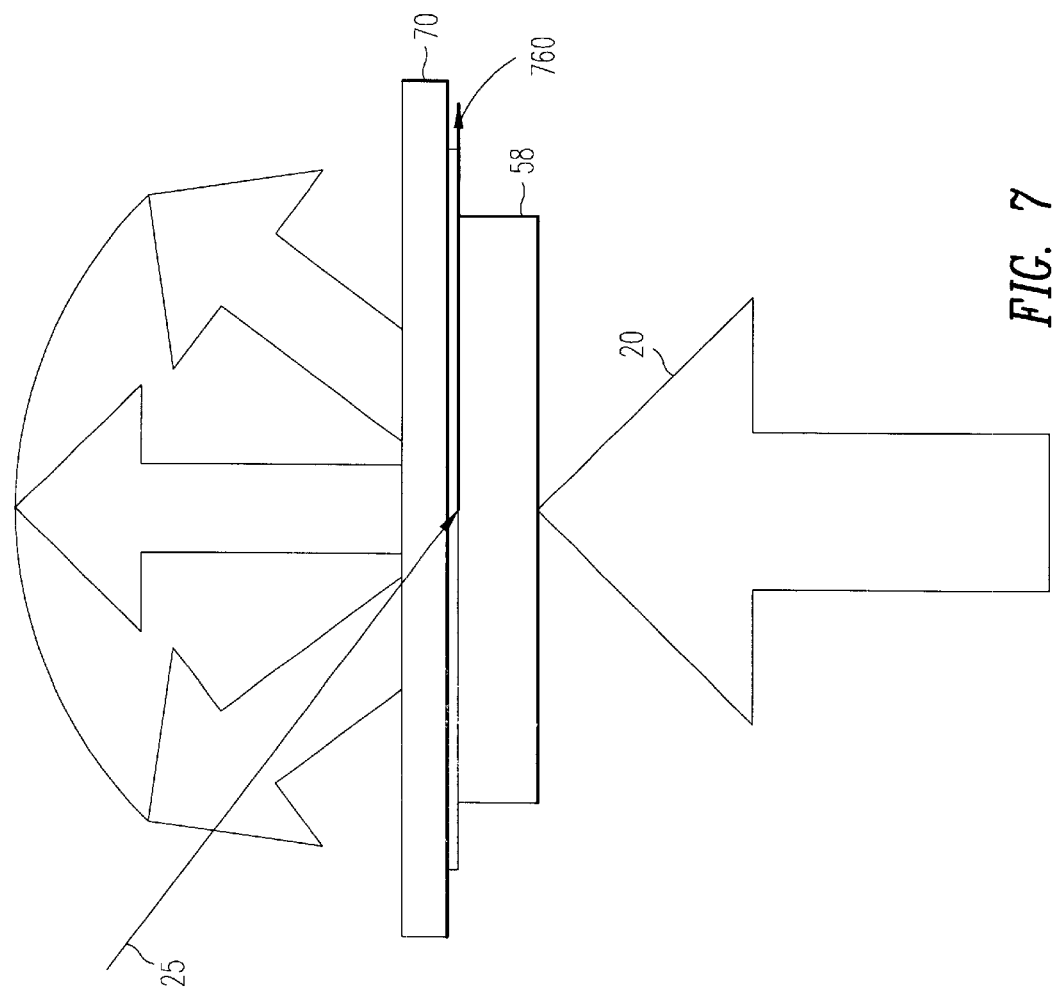
FIG. 7 shows still another example of a holographic deflector.

FIG. 7 illustrates a specialized case of a holographic deflector constructed according to the description of FIGS. 5 and 6. In this example, holographic deflector 760 is constructed with one beam that is oriented at an angle of incidence with respect to holographic recording material that is comparable to that of the reference beam in the printer with which the deflector will be used, and a second beam that is parallel to the holographic recording material. For example, the second beam could be introduced through a substrate laminated to the holographic recording material, and having a similar index of refraction. This would produce an edge-lit, or "trapped beam" holographic deflector, in which the impinging reference beam in the printer system would produce a diffracted beam that would travel through the holographic recording material and substrate itself, as if it were a light guide. Thus, holographic deflector 760 prevents the diffracted light from being reflected back into the holographic recording material 70.

One important aspect of the holographic deflector that makes it viable for producing reflection holograms in a one-step production process is that the holographic deflector has no appreciable effect on the object beam impinging from the opposite side. Moreover, unlike a standard mirror, which reflects broadband radiation nearly equally regardless of the input angle, the holographic deflector only deflects light in the desired bands impinging on it from the designed input angle. Thus, the holographic deflector can be designed to deflect a significant percentage of the light from the reference beam (e.g., impinging at 45 degrees from normal), while transmitting a maximum amount of the light from the object beam (e.g., impinging at 0 degrees).

Using a holographic deflector to prevent artifacts in a recorded hologram is readily adaptable to recording full color holograms. In a three color system, such as those disclosed in the aforementioned U.S. patent application Ser. No. 09/098,581, a separate holographic deflector is preferably provided for each color wavelength. The three deflectors can be laminated together in a sandwich to provide protection in all three wavelength bands. Also, if the holographic deflector has adequate efficiency, all three wavelength mirrors could be recorded in a single holographic recording material layer. If it were desirable, the three holographic deflectors could be made to operate at different impingement angles, and with different impingement wavefront curvatures. Finally, if the object beam diffuser 58 is a volumetric device, or a device with one planar side (as is the case for a lenticular diffuser), the holographic deflector can be applied directly to the planar surface, provided that the planar surface is facing the holographic emulsion during exposure of the hologram. This configuration would ensure the thinnest possible separation between diffuser 58 and the holographic recording material 70.

Although the disclosed embodiments have been described in detail, it should be understood that various changes, substitutions and alterations can be made to the embodiments without departing from their spirit and scope. In particular, those having ordinary skill in the art will readily recognize additional types of holographic optical elements, and techniques for constructing same, which can be used as holographic deflectors.

What is claimed is:

1. A system for recording a hologram in a holographic recording material, the holographic recording material having at least a portion including a first-surface and a second surface, the system comprising:

a diffuser disposed adjacent to the second surface whereby an object beam directed at the second surface can pass through the diffuser prior to contacting the holographic recording material; and a holographic deflector disposed between the second surface and the diffuser to prevent at least a portion of a reference beam directed at the first surface from impinging on the diffuser.

2. The system of claim 1, wherein the holographic deflector is operable to deflect the at least a portion of the reference beam away from the reference beam.

3. The system of claim 1, wherein the holographic deflector is operable to deflect the at least a portion of the reference beam at an angle equal to an angle of incidence of the reference beam.

4. The system of claim 1, wherein the holographic deflector is operable to deflect the at least a portion of the reference beam at an angle different from an angle of incidence of the reference beam.

5. The system of claim 1, wherein the holographic deflector is operable to deflect the at least a portion of the reference beam in a direction generally parallel to the second surface.

6. The system of claim 1, wherein the holographic deflector is operable to allow approximately all light from the object beam to pass therethrough and to deflect approximately all light from the reference beam.

7. The system of claim 1, wherein the holographic deflector further comprises:

a recorded interference pattern, the recorded interference pattern formed by the interference of a first beam with a reflection of the first beam from a mirror.

8. The system of claim 7, wherein the mirror is one of a planar mirror, a convex mirror, and a concave mirror.

9. The system of claim 1, wherein the holographic deflector further comprises:

a recorded interference pattern, the recorded interference pattern formed by the interference of a first beam directed at the holographic deflector at a first angle of incidence with a second beam directed at the holographic deflector at a second angle of incidence, wherein the first angle of incidence differs from the second angle of incidence.

10. The system of claim 1, wherein the holographic deflector further comprises a second holographic recording material, the second holographic recording material including a third surface; and an interference pattern recorded in the second holographic recording material, the interference pattern recorded in the second holographic recording material formed by the interference of a first beam originating at an angle not parallel to the third surface with a second beam originating at an angle substantially parallel to the third surface.

11. The system of claim 1, wherein the holographic recording material is one of a film and an emulsion.

12. The system of claim 1, wherein the object beam is directed toward the holographic recording material at an angle approximately normal to the second surface.

13. The system of claim 1, wherein the holographic deflector has a perimeter defined in part by at least one edge, and further comprising:

an absorbing material attached to the at least one edge to prevent light from the reference beam from passing therethrough.

14. The system of claim 1, wherein the diffuser is an anisotropic diffusers.

15. The system of claim 1, wherein multiple reference beams are directed at the first surface and multiple object beams are directed at the second surface for recording substantially full color holograms.

16. The system of claim 1, wherein multiple reference beams are directed at the first surface and multiple object beams are directed at the second surface for recording horizontal parallax only holograms.

17. The system of claim 1, wherein multiple reference beams are directed at the first surface and multiple object beams are directed at the second surface for recording full parallax holograms.

18. The system of claim 1, wherein the holographic deflector is coupled to the diffuser.

19. The system of claim 1 further comprising:

a laser operable to provide a coherent light beam;

a beam splitter disposed to split the coherent light beam into the reference beam and the object beam; and a spatial light modulator disposed between the holographic recording material and the beam splitter such that the object beam passes through the spatial light modulator.

20. The system of claim 19 wherein the spatial light modulator is a computer controlled liquid crystal display.

21. The system of claim 20 further comprising:

a computer system coupled to the liquid crystal display and operable to provide image data to the liquid crystal display.

22. A method for recording a hologram in holographic recording material, the holographic recording material having at least a portion disposed in a plane having a first surface and a second surface, the method comprising:

directing a reference beam at the first surface;

directing an object beam at the second surface;

providing a diffuser disposed adjacent to the second surface whereby the object beam will pass through the diffuser prior to contacting the holographic recording material;

deflecting at least a portion of a reference beam with a holographic deflector disposed between the second surface and the diffuser to prevent the reference beam from impinging on the diffuser; and recording an interference pattern formed by the reference beam and the object beam in the holographic recording material.

* * * * *